United States Patent [19]

Silinski et al.

[11] Patent Number: 5,102,503
[45] Date of Patent: Apr. 7, 1992

[54] MOBILE SELF-CONTAINED SYSTEM FOR ON-SITE RECOVERY OF SOLVENTS

[75] Inventors: Thomas J. Silinski, Lake Orion; Robert A. Walz, Utica, both of Mich.

[73] Assignee: Environmental Technology Group Corporation, Rochester Hills, Mich.

[21] Appl. No.: 389,577

[22] Filed: Aug. 4, 1989

[51] Int. Cl.⁵ .................... B01D 1/22; B01D 3/02; B60P 3/22

[52] U.S. Cl. .................... 202/83; 202/166; 202/181; 202/185.3; 202/202; 202/204; 202/206; 202/235; 202/236; 159/DIG. 32; 203/1; 203/98; 203/100; 203/DIG. 25; 210/801; 210/802; 210/241; 210/251; 210/265; 210/266; 280/838; 280/839

[58] Field of Search ........... 202/83, 170, 204, 202, 202/181, 185.3, 235, 236, 206, 266, 176, 166; 203/100, 1, 98, DIG. 7, DIG. 18, 2, 89, DIG. 22, DIG. 25; 159/DIG. 32, 6.3, 11.3, 901; 210/241, 251, 265, 266, 801, 802; 280/837–839

[56] References Cited

U.S. PATENT DOCUMENTS

| | | | |
|---|---|---|---|
| 718,209 | 1/1903 | Kirkaldy | 202/83 |
| 3,094,468 | 6/1983 | Topham | 203/DIG. 7 |
| 3,521,691 | 7/1970 | Donovan | 202/236 |
| 3,587,488 | 6/1971 | Mutke et al. | 159/DIG. 32 |
| 3,630,365 | 12/1971 | Woodbridge et al. | 210/241 |
| 3,826,718 | 7/1974 | Takayasu | 202/181 |
| 4,080,247 | 3/1978 | Malakul | |
| 4,299,665 | 11/1981 | Clay | 202/204 |
| 4,488,933 | 12/1984 | Claunch et al. | 202/83 |
| 4,496,431 | 1/1985 | Fowler | |
| 4,575,404 | 3/1986 | Goto et al. | 202/202 |
| 4,714,558 | 12/1987 | Barbee et al. | 210/802 |
| 4,734,159 | 3/1988 | Korenowski | 159/DIG. 32 |
| 4,753,735 | 6/1988 | Figiel | 210/266 |
| 4,888,097 | 12/1989 | Palmer et al. | 202/181 |

FOREIGN PATENT DOCUMENTS 0155919 3/1985 European Pat. Off.

OTHER PUBLICATIONS

"Electric Steam Boilers", Cleaver & Brooks, 6/89.

Primary Examiner—Wilbur Bascomb, Jr.
Attorney, Agent, or Firm—Barnes, Kisselle, Raisch, Choate, Whittemore & Hulbert

[57] ABSTRACT

A system for on-site recovery of reusable industrial waste components, such as solvents, from a liquid waste stream includes a trailer that is internally partitioned to separate system components through which the waste stream passes in a first partitioned section of the trailer from support and control components in the second trailer section. Input waste is fed into a horizontal thin-film evaporator within the first trailer section, while steam is fed in a closed loop through the evaporator from the second section of the trailer for evaporating volatile solvents in the waste stream, and thereby separating the volatile solvents from non-volatile liquid and solid components of the waste stream. The evaporated volatile solvents are fed to a heat exchanger, again enclosed within the first partitioned section of the trailer, for recondensation through heat exchange with a coolant fed to the heat exchanger in a closed loop from the second trailer section. The recondensed solvents are then fed to a water separator tank and a molecular sieve for separation of immiscible and miscible water from the solvents, and thence to a holding tank for resupply to the customer. The non-volatile components of the evaporator output are fed to a second holding tank for recirculation through the evaporator or return to the customer for disposal.

23 Claims, 8 Drawing Sheets

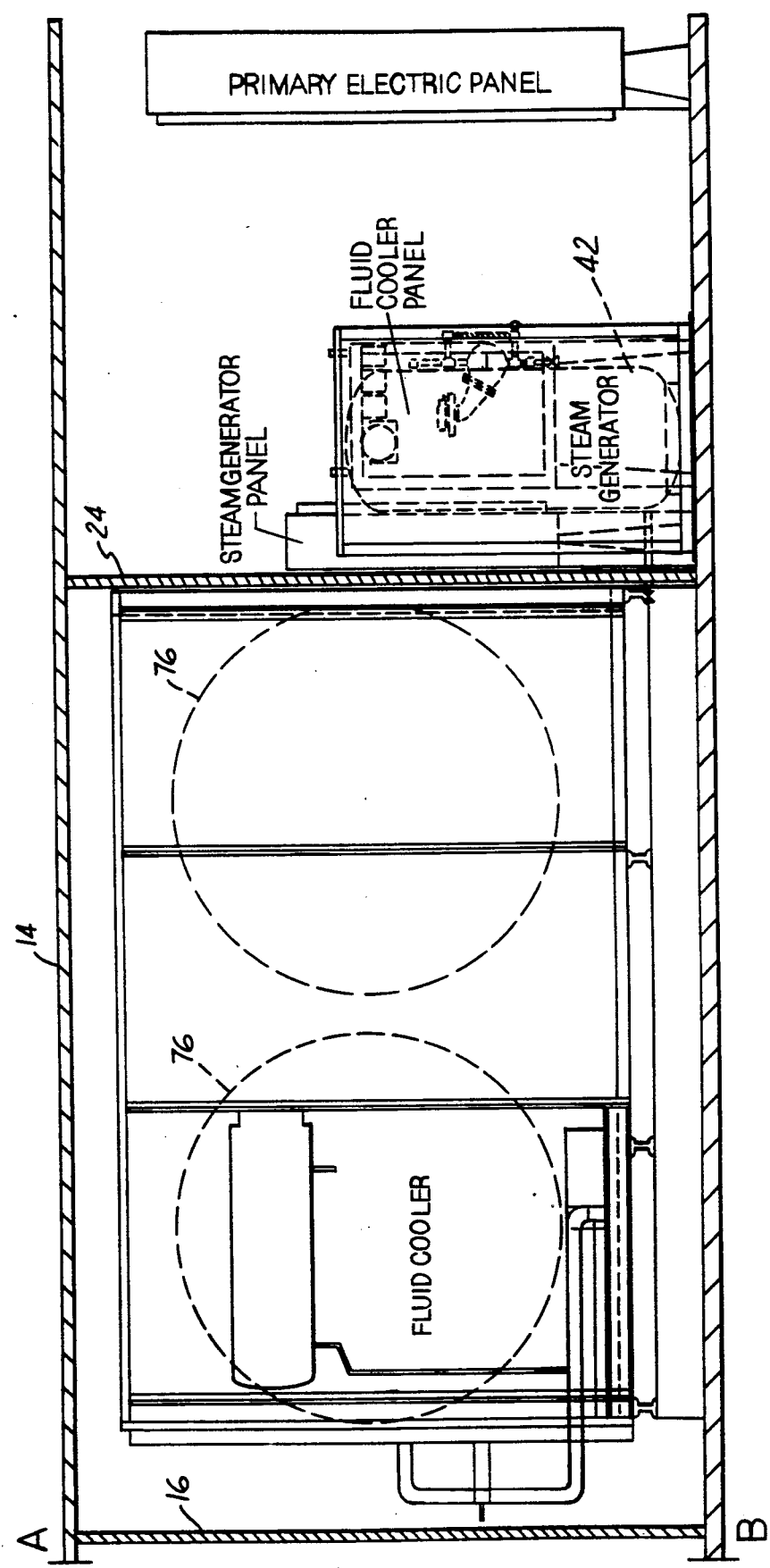

MOBILE SELF-CONTAINED SYSTEM FOR ON-SITE RECOVERY OF SOLVENTS

The present invention is directed to processing of industrial waste, and more particularly to equipment for recovering solvents from a contaminated waste stream.

There are many applications in industry where it is desirable to recover reusable components of a contaminated waste stream. One such application involves recovery of cleaning solvents from the waste of a painting process by separation of the cleaning solvents from the resin and pigment solids and the resin paint solvent. Typically, recovery processes in accordance with prior art techniques involve transport of the industrial waste to a processing site, with attendant increased cost and danger of leakage during transport.

It is a general object of the present invention to provide a self-contained mobile system for on-site recovery of reusable industrial waste components, such as volatile solvents, that eliminates risk and cost associated with transport of the waste to a processing site, that eliminates contamination of materials due to comingling of wastes from multiple sources, that helps reduce quantity of waste requiring disposal and therefore helps the customer meet federal and state waste disposal regulations, that reduces the danger of escape of waste into the environment, that requires no additional personnel or equipment by a customer, and that economically recovers solvents for reuse by the customer.

In a preferred embodiment of the present invention, a system for on-site recovery of reusable industrial waste components, such as solvents, from a liquid waste stream includes a trailer that is internally partitioned with an unpierced three-hour fire wall to separate system components through which the waste stream passes in a first partitioned section of the trailer from support and control components in the second section of the trailer. Input waste is fed into a horizontal thin-film evaporator within the first trailer section, while steam is fed in a closed loop through the evaporator from the second section of the trailer for evaporating volatile solvents in the waste stream, and thereby separating the volatile solvents from non-volatile liquid and solid components of the waste stream. The evaporated solvents are fed to a heat exchanger, again enclosed within the first partitioned section of the trailer, for recondensation through heat exchange with a coolant fed to the heat exchanger in a closed loop from the second trailer section. The recondensed solvents are then fed to a water separator tank and molecular sieve tanks for separation of immiscible and miscible water from the solvents, and thence to a holding tank for resupply to the customer. The non-volatile components of the evaporator output are fed to a second holding tank for recirculation through the evaporator and/or return to the customer for disposal.

The first section of the trailer that contains the waste-contacting system components, and underside of the entire trailer, is of explosion proof intrinsically safe construction and designed as a Class I Division 1 Group C and D hazardous location. The waste-contacting section of the trailer also includes a stainless steel containment liner having a capacity that at least equals, and preferably exceeds, that of the system for preventing spillage onto the ground in the event of system leak. Flexible couplings are employed to absorb and withstand stresses associated with operation and transportation of the system over the road. The system is designed to operate under extreme climatic conditions of temperature, moisture and precipitation.

The invention, together with additional objects, features and advantages thereof, will be best understood from the following description, the appended claims and the accompanying drawings in which:

Figure 1:
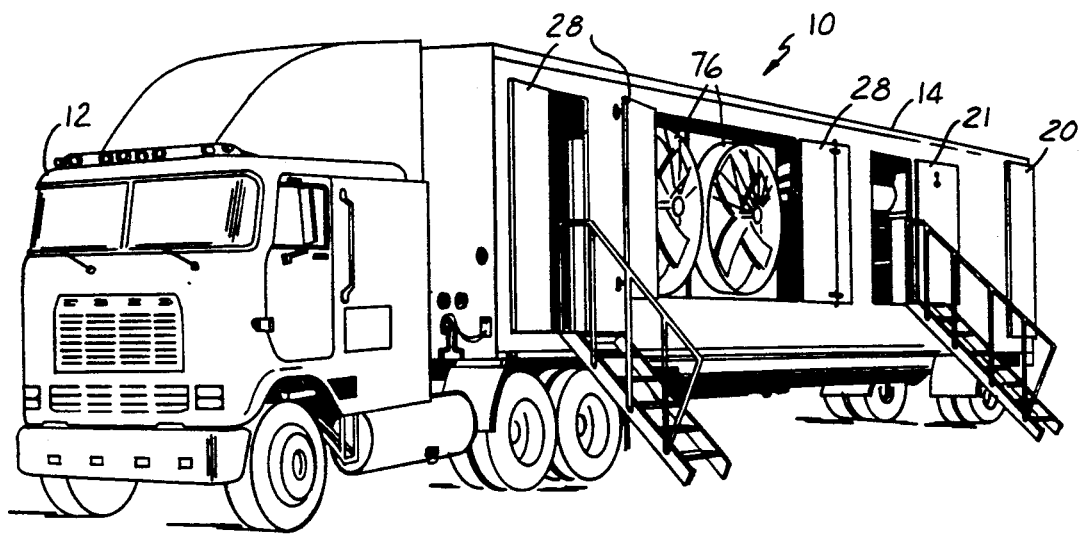
FIG. 1 is front perspective view of a trailer that houses a self-contained mobile system for on-site recovery of reusable solvents in accordance with a presently preferred embodiment of the invention.
Figure 2:
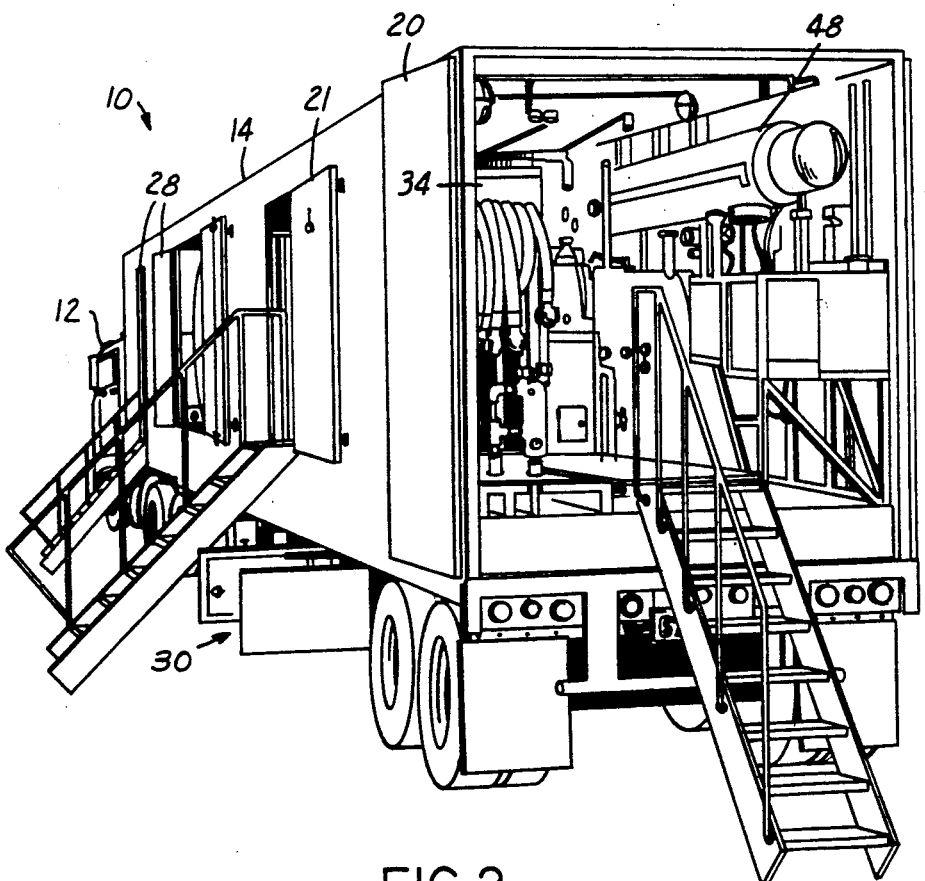
FIG. 2 is a rear perspective view of the trailer illustrated in FIG. 1.
Figure 3A:
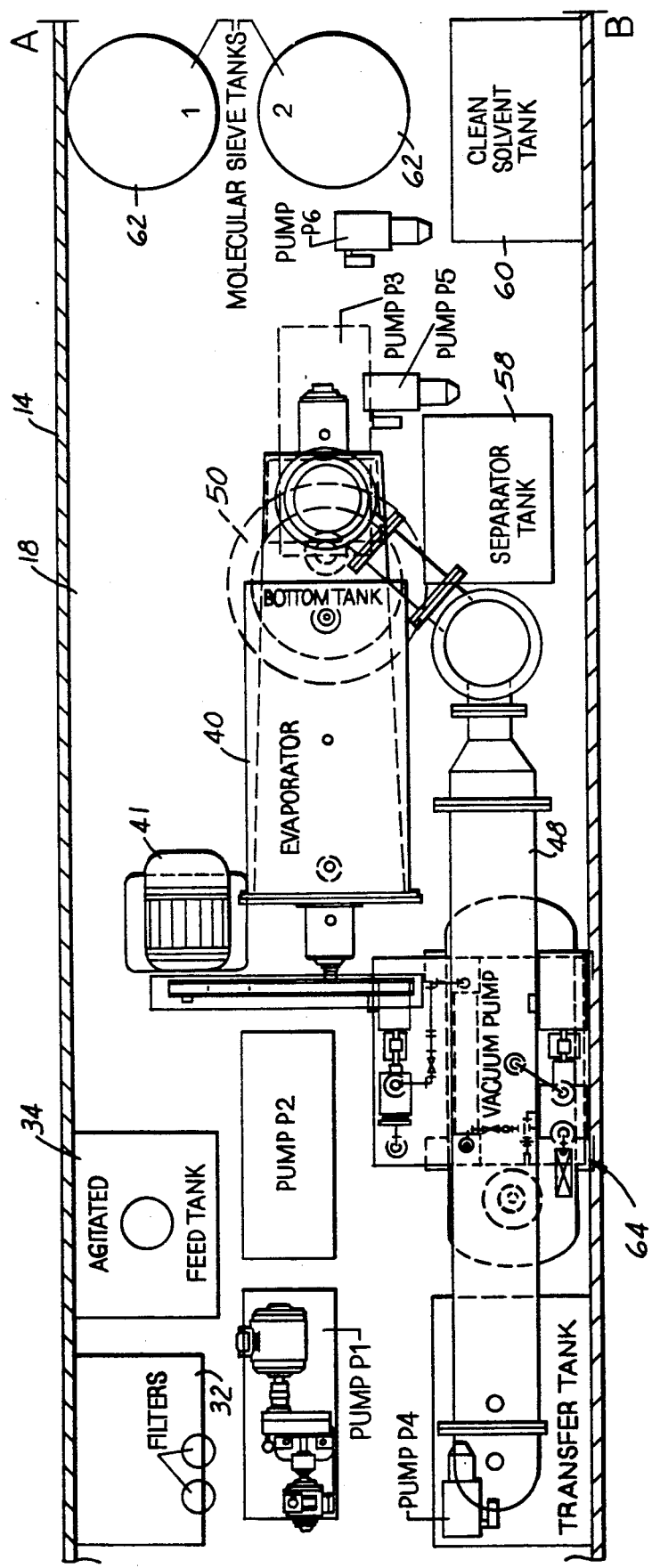
Figure 3B:
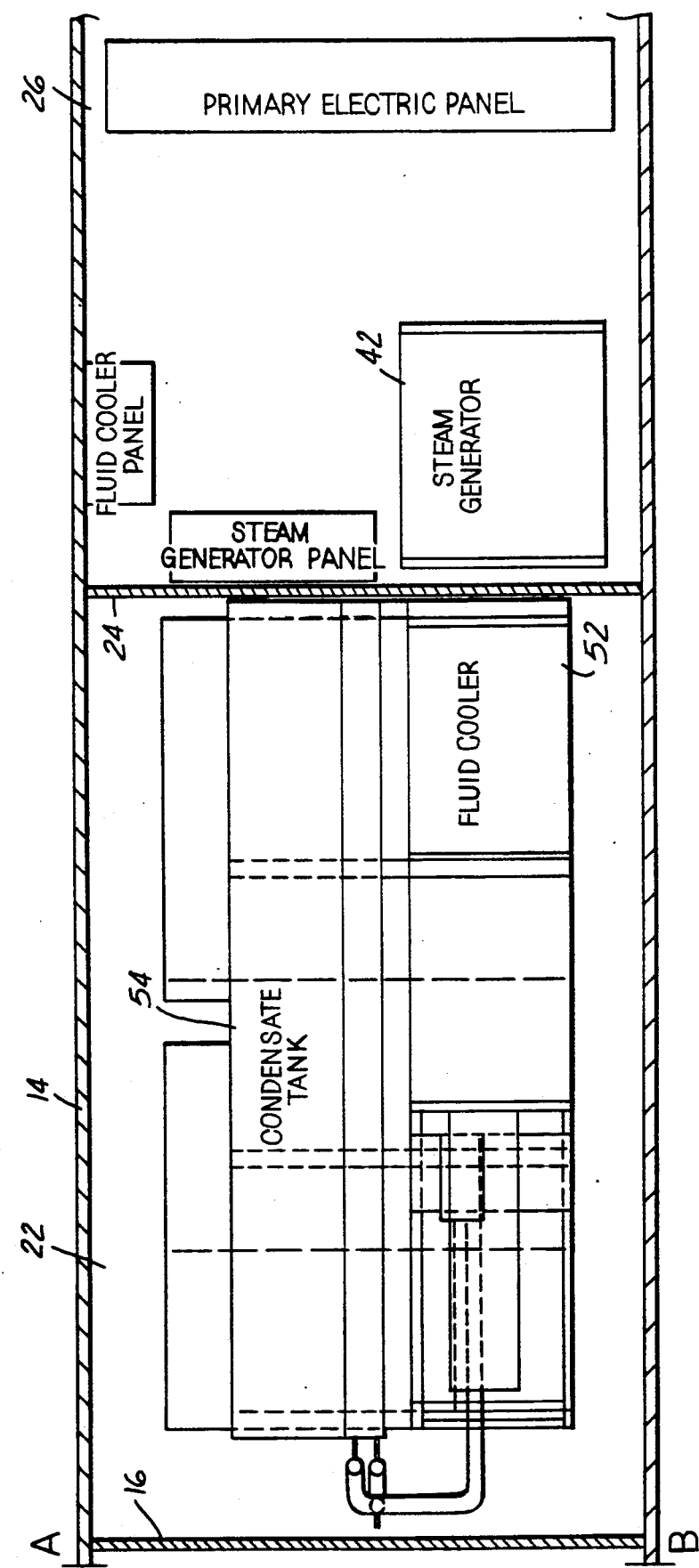
Figure 4A:
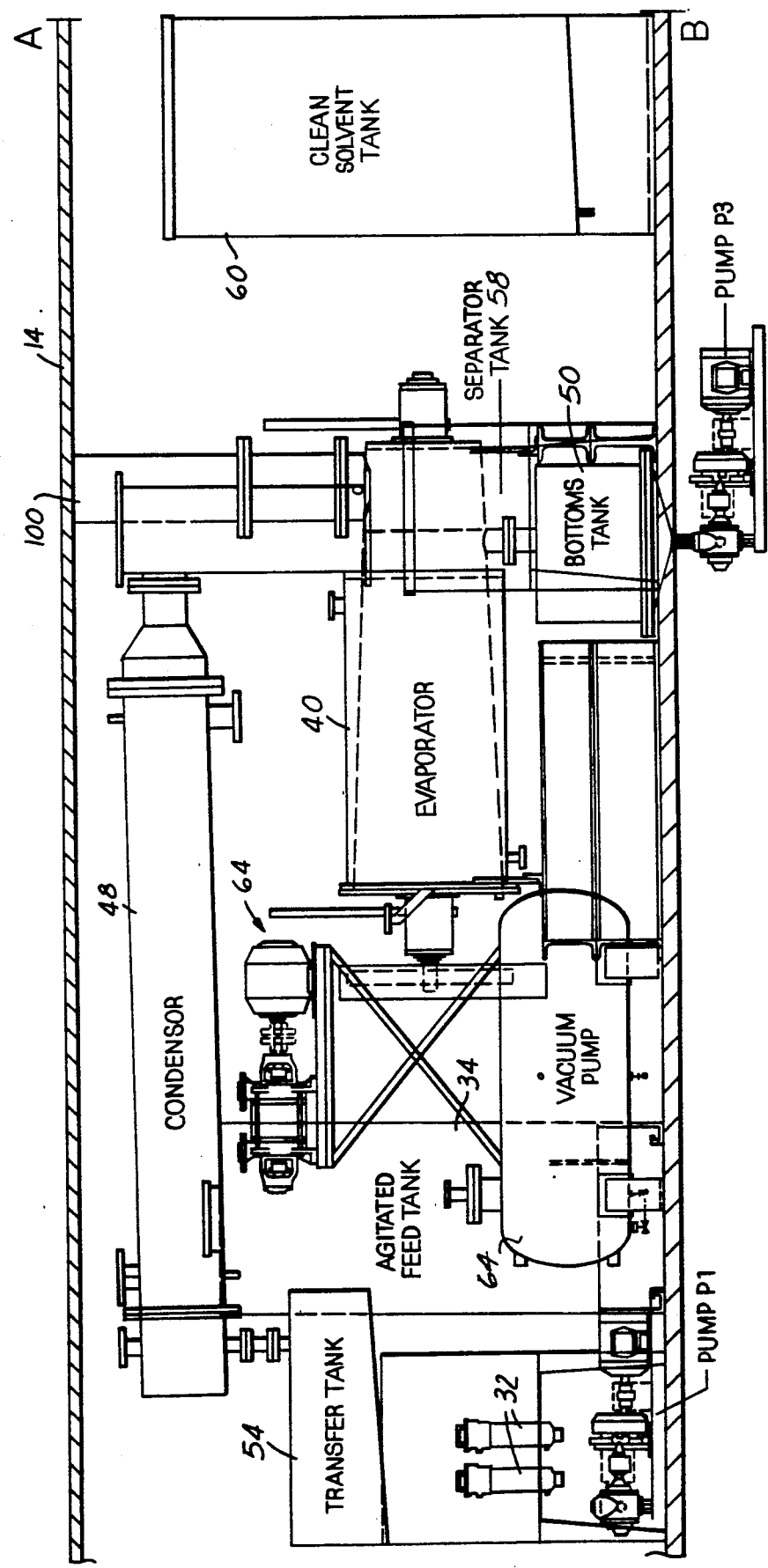
Figure 5:
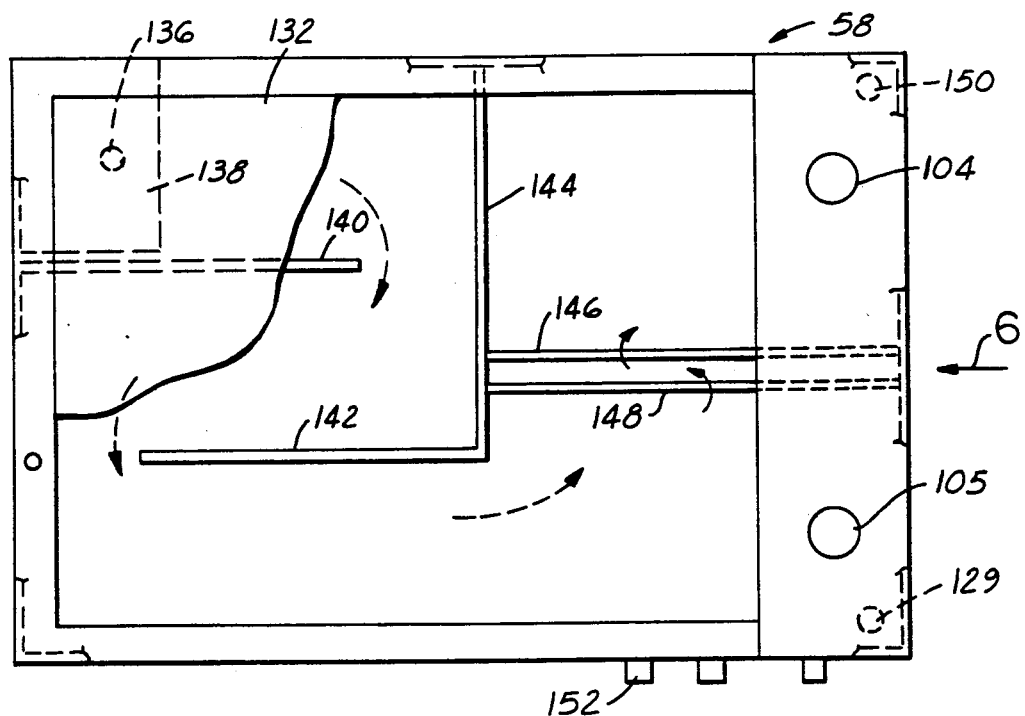
Figure 6:
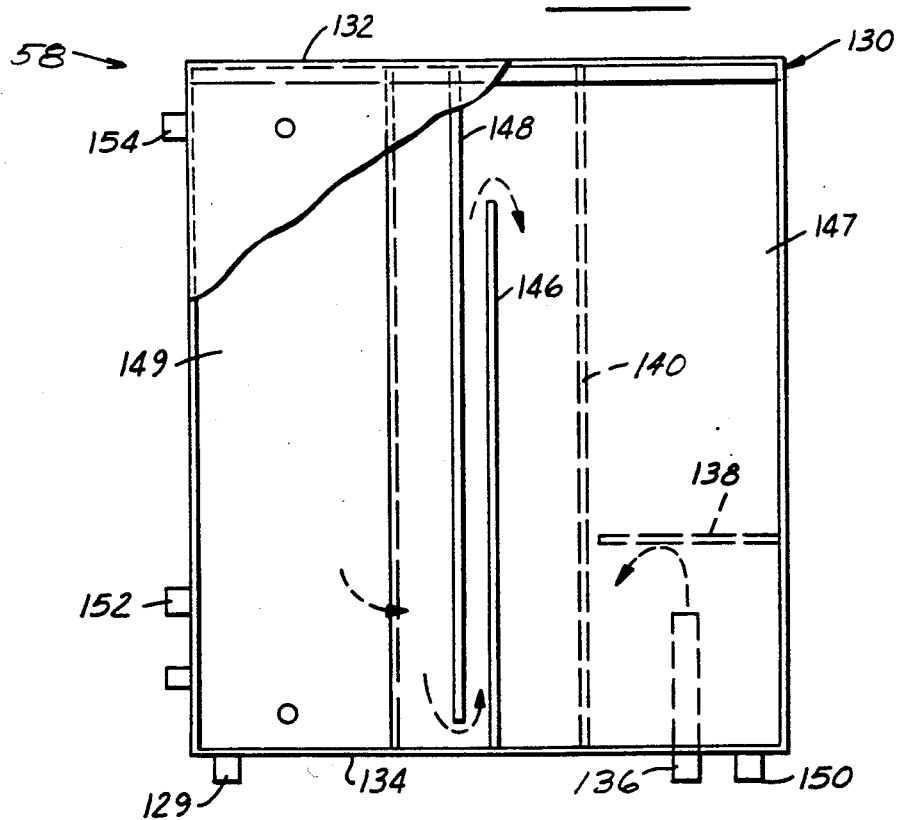
Figure 7A:
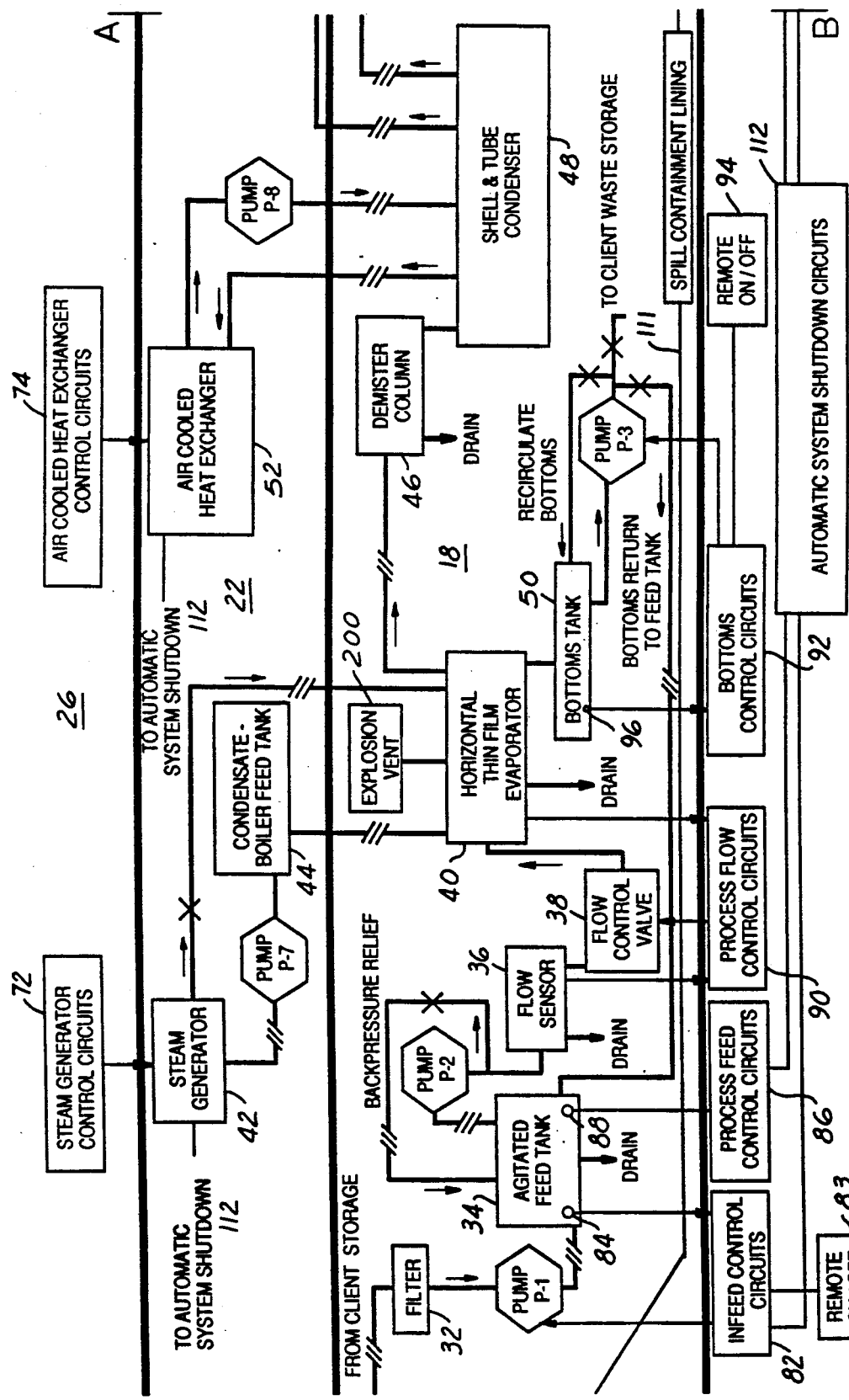
Figure 7B:
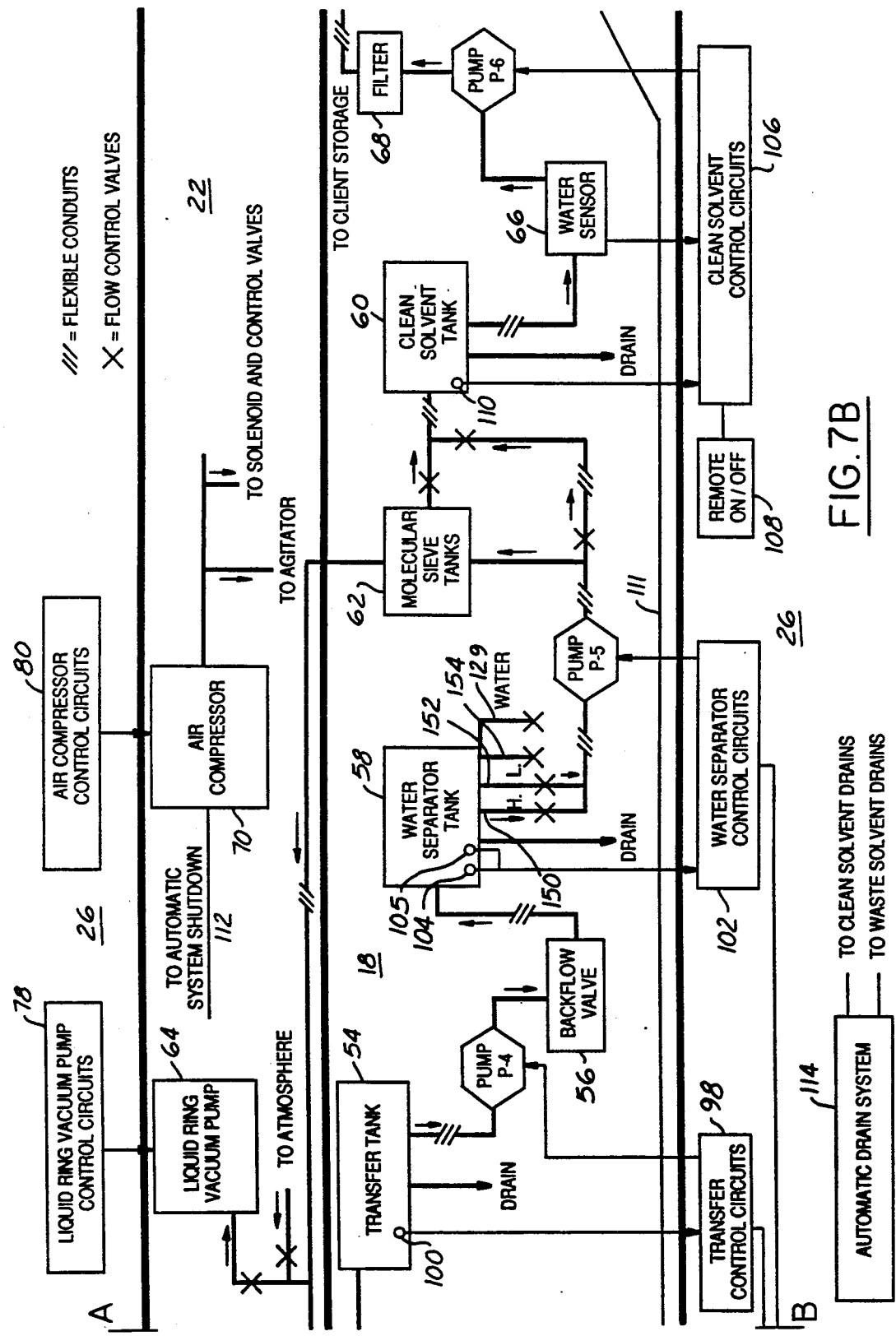

FIGS. 3A and 3B, when interconnected along the line A-B in each figure, comprise a top plan view of the trailer in FIGS. 1 and 2 illustrating location of the system components;

FIGS. 4A and 4B, when interconnected along the line A-B in each figure, comprise a side elevational view of the trailer in FIGS. 1 and 2, again illustrating location of system components;

FIG. 5 is a partially sectioned top plan view of the immiscible liquid separation tank in the preferred embodiment of the invention;

FIG. 6 is a partially sectioned end elevational view of the tank, being taken in the direction 6 in FIG. 5; and FIGS. 7A and 7B together comprise a schematic diagram of the recovery system in accordance with the preferred embodiment of the invention.

A system 10 in accordance with a presently preferred embodiment of the invention illustrated in the drawings includes a tractor 12 and a trailer 14 that houses all system components for transport between job sites. Trailer 14 is internally divided or partitioned by an unpierced fire wall 16 (FIGS. 3B and 4B) to form a first section or chamber 18 adjacent to the rear trailer doors 20 (FIGS. 1 and 2) for housing system components that contact liquid waste, and separating such components from a second section 22 (FIGS. 3B and 4B) that houses support components. A second partition or wall 24 separates such support components from the electrical control circuitry contained within a third trailer section 26 adjacent to the front of the trailer. Side doors 28 (FIGS. 1 and 2) afford access to sections 26, 22, while access to section 18 is obtained through rear doors 20 and side door 21.

Referring now to FIGS. 1-2, 3A, 4A and 7A, an in-feed hose reel 30 is mounted beneath trailer section 18 adjacent to doors 20 for feeding liquid waste through a filter 32 to a pump P1. The output of pump P1 is directed to a feed tank 34 that includes suitable means for agitating waste material contained therewithin. A second pump P2 selectively feeds waste material from tank 34 through a flow sensor 36 and a flow control valve 38 to the input of a horizontal thin-film evaporator 40. A back pressure relief line returns the output of pump P2 to tank 34 as required. An electrically controllable steam generator 42 positioned within trailer section 22 (FIGS. 3B, 4B and 7A) feeds steam at controllable temperature in a closed loop through a tank 44 and a pump P7 to evaporator 40 through a tank 44 and a pump P7, and back to generator 42 for heating the waste stream passing therethrough and thereby evaporating volatile waste material in the waste stream. Evaporator 40 is belt-driven by a motor 41 (FIG. 3A).

The vapor output of evaporator 40 is fed to a demister column 46, and thence to a condenser 48 (FIGS. 3A, 4A and 7A). The non-volatile output of evaporator 40 is fed to a bottoms storage tank 50. A pump P3 selectively feeds the contents of tank 50 through associated valves in a recirculation loop to maintain the solid waste suspended within the non-volatile liquid waste, in a return path to agitated feed tank 34 for recirculation through evaporator 40, or to customer waste storage for disposal. A coolant, preferably water or an ethylene glycol solution, is fed in a closed loop by a pump P8 through a heat exchanger 52 positioned within section 22, and through condenser 48 for recondensing the volatile waste components passing therethrough from demister column 46. The recondensed output of condenser 48 is fed to a transfer tank 54 (FIGS. 4A and 7B). The contents of tank 54 are selectively fed by a pump P4 through a check valve 56 to a tank 58 for separation of immiscible components, specifically separation of water from the chlorinated and non-chlorinated solvents. Tank 58 has separate output ports 150, 152 for heavy and light fluids that are selectively connected by a pump P5 and associated valves to a clean solvent storage tank 60 (FIGS. 3A, 4A and 7B), either directly or through molecular sieve tanks 62 for removing miscible water from the solvent stream. A liquid ring vacuum pump 64 (FIGS. 3A, 4A and 7B) has a vacuum input connected to sieve tank 62 and condenser 48. The clean solvent contained within tank 60 is selectively fed by a pump P6 to the customer solvent storage facility through a water sensor 66 (FIG. 7B) and a final filter 68. An air compressor 70 (FIG. 7B) is mounted within trailer section 22 for activating the agitator on tank 34 and operating all valves illustrated in the drawings.

Electrical control circuitry mounted within trailer section 26 is illustrated schematically in FIGS. 7A and 7B as comprising steam generator control circuits 72 that selectively apply utility power to steam generator 42 for controlling the temperature of the steam circulated in the closed loop through tank 44, pump P7 and evaporator 40, heat exchange control circuits 74 for selectively applying utility power to the fans 76 and coolant circulation pump P8 (FIGS. 1 and 4B) of heat exchanger 52 to control cooling at the heat exchanger, a liquid ring vacuum pump control circuit 78 for selectively applying utility power to vacuum pump 64 (FIGS. 7B) to control vacuum applied to sieve tank 62 and condenser 48, and air compressor control circuits 80 for selectively applying utility power to compressor 70 to activate the agitator on tank 34 and operate all valves illustrated in the drawings. In-feed control circuitry 82 (FIG. 7A) is responsive to operator command at on/off switch 83 to activate pump P1, and to a level detector 84 in tank 34 to deactivate pump P1 when tank 34 is full. Likewise, process feed control circuits 86 are responsive to operator command for activating pump P2 to feed waste from tank 34 to evaporator 40, and to a level detector 88 within tank 34 for terminating pump operation when the tank is empty. Flow control valve 38 is responsive to flow sensor 36 and flow control circuits 90 for maintaining a constant flow rate from pump P2 to evaporator 40, with excess output of pump P2 being returned to tank 34.

Bottoms control circuitry 92 (FIG. 7A) is responsive to an on/off level sensor for activating pump P3 to recirculate the material in bottoms tank 50. Operator activation of an on/off control switch 94 allows for activation of solenoid valves to allow the bottoms material to be pumped to customer waste storage or to recirculate the material to feed tanks 34. A level detector 96 in tank 50 terminates operation of pump P3 when tank 50 is empty.

A transfer control circuit 98 (FIG. 7B) is responsive to operator input for activating pump P4, and to a level sensor 100 in tank 54 for initiating or terminating pump operation when the tank is full or empty. Likewise, water separator control circuits 102 activate pump P5 and are responsive to sensors 104, 105 in tank 58 for initiating or terminating pump operation. Control circuits 106 are responsive to remote operator on/off activation 108 to activate pump P6 and feed clean solvent to a customer storage facility. Control circuits 106 are also responsive to a level sensor 110 in clean solvent tank 60 for terminating pump operation when the tank is empty, and to water sensor 66 for terminating pump operation in the event that water is detected in the clean solvent material passing therethrough. All the control circuits are responsive to automatic shutdown circuitry 112 (FIGS. 7A) for terminating operation in the event of an alarm condition, and to automatic drain control circuitry 114 for draining all tanks prior to transport of the system over the road.

With the exception of separator tank 58 to be described in detail in connection with FIGS. 5–6, all of the tanks, valves, pumps, sensors, heat exchangers and condensers, evaporator and steam generator are individually of conventional construction. A stainless steel liner 111 (FIGS. 7B and 7B) is provided on the floor of trailer section 18 for containing any leakage or spillage from the waste-contacting system components, and thereby reducing the hazard of spillage onto the ground.

In operation, samples of customer waste material from which solvent is to be separated are first tested to identify the materials in question, and to determine empirically the desired temperature, pressure and feed rate through the evaporator for solvent separation. When these parameters have been determined, system 10 is transported to the job site and set up at a location convenient for connection to electrical power and to the customer waste and storage facilities. In this connection, it will be appreciated that the mobile on-site processing system of the present invention accepts liquid waste from drums, tanks or bulk containers, returns processed product to drums, tanks or bulk containers, and returns non-recoverable waste to drums, tanks or bulk containers that are the responsibility of the customer for proper use and disposal.

After the system has been transported to a job site and set up at a location convenient for connection to electrical power, and waste and solvent storage, steam generator 42 is activated and pump P7 begins circulating water from tank 44 to the steam generator. This process continues until steam temperature and pressure are at the desired level for the empirically selected operating temperature of evaporator 40. An initial quantity of waste material is fed by pump P1 through filter 32 into tank 34. The tank agitator is started automatically when the waste material reaches a predetermined level. When tank 34 is full, pump P1 is deactivated by level detector 84 and control circuits 82. Tank 34 operates at atmospheric pressure.

The amount of volatile solvent extracted from the waste stream is determined by the residence time of the waste stream in evaporator 40, the evaporation temperature and the vacuum level. These parameters are empirically predetermined and thereafter controlled through flow control valve 38, which determines feed rate through the evaporator and therefore evaporator residence time, steam generator 42, which determines the evaporator operating temperature, and liquid vacuum ring pump 64, which determines evaporator vacuum level. The control circuitry associated with these components is preset prior to operation, and operation is monitored throughout the recovery process. Evaporation of recyclable components is accomplished in evaporator 40. Steam produced at generator 42 is routed to the evaporator heat exchange jacket while a vacuum is maintained within the evaporator by the liquid ring vacuum pump. The evaporator is equipped with a pressure relief explosion vent 200 that is designed to relieve internal pressure greater than five psi gauge through a duct in the trailer roof. Waste is pumped into the evaporator through flow control valve 38 at rates in the range of 1 to 15 gallons per minute, for example. The waste is spread by wiper blades onto the wall of the horizontal heated cylinder within evaporator 40 to produce an agitated thin-film that facilitates heat transfer and evaporation of volatile components as the thin-film progresses along the heated surface. Horizontal thin-film evaporators of the subject type are preferred because of high heat transfer rates at low operating temperatures. Such evaporators permit processing of highly viscous waste streams containing contaminates that are difficult to handle, such as thermosetting resins and polymers. Horizontal thin-film evaporators of the subject type are generally well known in the art, and a presently preferred evaporator is manufactured by The Kontro Co. of Orange, Mass. and marketed under the trade designation Model 32.

Non-volatile waste components remaining in the stream passing through evaporator 40 are discharged and collected in bottoms tank 50. Liquids in the bottoms tank are recirculated by pump P3. Discharge of the bottoms is accomplished by manual activation of pump P3 from pump control circuits 92 when appropriate tank level conditions are met. The output of pump P3 is switched from the recirculation mode to the discharge mode by the bottoms discharge control logic and air-operated valves. This enables discharge of material from the vacuum side of the process. The flows of volatile and non-volatile components from the evaporator are in the same direction. This minimizes possible contamination of the volatile component stream by finely dispersed non-volatile particles that may be present in the waste stream. The volatile component vapors exit the evaporator into demister column 46, which contains a baffling network and a column of stainless steel mesh or the like designed to trap fine particles and droplets that may be suspended in the vapor stream.

Recondensation of the volatile component vapors is accomplished in condenser 48, which preferably comprises a shell and tube heat exchanger. Vapors are applied to the shell side of the condenser to take advantage of the cooling capacity of the surrounding air. Cooling water is circulated through the tube side of the condenser heat exchanger through the closed loop that includes heat exchanger 52. Outside air is drawn through heat exchanger 52 by fans 76 (FIGS. 1 and 4B). The temperature and pressure of the coolant are continuously monitored by control circuits 74 and are regulated at preset levels. Preferably, condenser/heat exchanger 48 is pitched, as at two degrees for example, to facilitate flow of condensed liquid from the condenser to transfer tank 54. The condensed liquid is collected in the transfer tank under vacuum. Transfer tank level is controlled and, when predetermined levels of recycled product are collected, liquids are transferred to separator tank 58 by pump P4. Back-flow check valve 56 enables removal of the distillate from the vacuum side of the process. Should this transfer malfunction, a high level sensor produces an alarm indication by means of transfer control circuit 98 and initiates an automatic shutdown sequence.

As will be discussed in greater detail in connection with FIGS. 5 and 6, separator tank 58 eliminates immiscible water from the condensed solvent. The tank can remove water that is either heavier than or lighter than the condensed reclaimed liquid. This is controlled automatically by water separator control circuitry 102. Product is removed from tank 58 by pump P5 under control of circuit 102. Water is monitored and removed through an automatic drain 129 if heavier than the reclaimed liquid or drain 154 if lighter than the reclaimed liquid. Automatic drain 129 is controlled by the water separator control logic. High level sensors 104, 105 produce an alarm indication in the event that water separator tank 58 overfills and initiate an automatic shutdown sequence. Tank 58 is operated at atmospheric pressure. Any dissolved water is removed from the clean solvent stream by molecular sieve tanks 62. Clean product is collected in tank 60. This tank is also level controlled and provides temporary storage for recycled product prior to transfer to the customer storage. Discharge from tank 60 is accomplished by manual activation of pump P6, which is enabled when sufficient quantities of clean product are contained in tank 60. A high level sensor initiates an automatic shutdown sequence should this tank overfill. Clean product pumped to the customer storage containers passes through water sensor 66, which is designed to sense any water which inadvertently passed through the system, and to disable pump P6 to prevent water from contaminating the clean product. Tank 60 is operated at atmospheric pressure.

Shutdown circuitry 112 automatically terminates operation upon occurrence of any of the alarm conditions herein discussed. The shutdown sequence involves blocking steam to the evaporator, blocking the vacuum from the process, and then venting the process to atmosphere. This combined action removes heat from the evaporator and stops vapor formation. In-feed waste is allowed to flow for a predetermined time to cool the evaporator heating surfaces. Such material is not vaporized to any significant extent and flows to the bottoms tank, thereby helping to cool the material in the bottoms tank and the heated evaporator surface. At the end of the preprogrammed shutdown sequence duration, process feed pump P2 is shut down. Process shutdown can also be initiated manually by the operator from the control panels within trailer section 26.

When material processing has been completed, the equipment is completely drained prior to transport over the road. First, all recondensed liquids remaining in the process are advanced to the clean product stage. System drainage is accomplished in two stages by automatic drain system 114. The first stage drains into bottoms tank 50 all vessels, pumps and pipes containing dirty material. Manual safety valves backup this automatic operation. Dirty material is then pumped from the bottoms tank to the customer's designated containers and labeled for disposal. During the second stage of the drain mode of operation, material that has been evaporated and is residing in the product side of the process is drained into the bottoms tank from each vessel, pump and line in the clean side of the process. This material is essentially clean product that has not passed through water sensor 66 or filter 68. This material in the bottoms tank is then pumped back into the in-feed tank through a recirculation line, and is run through the cold process equipment to rinse and flush dirty material from the evaporator surfaces. This material is then drained to customer storage for processing at a future date. Preferably, the process equipment piping is then pressurized to ensure that all material has been removed from the equipment.

Separator tank 58 is illustrated in greater detail in FIGS. 5 and 6 as comprising a generally rectangular enclosure 130 having a top wall 132 and a bottom wall 134. A product inlet 136 is positioned at one corner of bottom wall 134 and directs inlet fluid upwardly against an opposing baffle 138. In-fed product is then routed around a pair of parallel baffles 140, 142 to slow velocity of inlet fluid and thereby begin the process of phase separation of the immiscible liquids. The internal volume of enclosure 138 is separated into two chambers by a lateral partition 144 and a pair of spaced parallel partitions 146, 148. It will be noted in FIG. 6 that partition 148 extends downwardly from top wall 132 and has a lower edge spaced from bottom wall 134. In like manner, partition 146 extends upwardly from bottom wall 134 and has a upper edge spaced from top wall 132. A first outlet 150 is carried by bottom wall 134 within the chamber 147 defined by partitions 144–148. A second drain 152 is carried at the lower portion of the inlet chamber 149. A third drain 154 is carried at the upper portion of the inlet chamber, and a fourth drain 129 is carried at the bottom wall 134 of inlet chamber 149. Drain 150 provides for separation of heavy components in a "heavy" mode of operation, drain 152 provides for separation of light components during a "light" mode of operation, and drains 129, 154 provide for separation and removal of water as previously described.

If the product liquid is heavier than the waste liquid, water separator control circuits 102 (FIG. 7B) are placed in the "heavy" mode of operation. When a heavy/light immiscible mixture is pumped into the tank, the liquid flows around baffles 138, 140, 142 (FIGS. 5 and 6) to reduce the velocity of the liquid and begin the phase separation process. The heavier liquid sinks to the bottom of the tank, while the lighter liquid rises to the top. As additional liquid is pumped into the tank, the heavier liquid passes beneath partition 148 up through the raceway between partitions 146, 148 and spills over partition 146 into chamber 147. This chamber fills with the heavy fluid that is free of the lighter liquid. When the heavy liquid reaches a predetermined level detected by sensor 104, the liquid is drained through outlet 150 by pump P5 (FIG. 7B) and the associated valve controlled by circuits 102 in the "heavy" mode of operation. Light liquid—e.g. water—that accumulates in chamber 149 is removed through outlet 154.

If the product liquid is lighter than the waste liquid, the automatic valves and level controls are set for a "light" mode of operation by control circuits 102. The light/heavy mixture is pumped into the tank around baffles 138, 140, 142 to begin the phase separation process. The heavier liquid settles to the bottom of the tank and the lighter liquid rises to the top. As additional liquid is pumped into the tank, the heavier liquid continues to accumulate at the bottom of the liquid mass and the lighter liquid accumulates at the top of the liquid mass. As the light liquid continues to accumulate, it reaches a preset level detected by sensor 105 and activates pump P5 which draws the light liquid out through opening 152 until sensor 105 reaches a cut off level and the pump is deactivated. Heavy liquid—e.g., water—that accumulates in chamber 149 is sensed by a capacitance probe that activates drain 129, which remains open for an adjustable duration and removes the water.

The invention claimed is:

1. A mobile system for on-site recovery of reusable components from a liquid waste stream comprising:

a wheeled support base including means for transport of said base between job sites, evaporator means carried by said base and including inlet means for selectively receiving a waste stream at a job site and directing such waste stream in a continuous uninterrupted flow into and through said evaporator means, means for heating the waste stream during said continuous uninterrupted flow through said evaporator means to a temperature coordinated with residence time of the waste stream flow in said evaporator means for evaporation of volatile from non-volatile components of the waste stream, and first and second outlet means on said evaporator means for receiving said continuous flow of said volatile and non-volatile components respectively, condenser means coupled to said first outlet for receiving and condensing said volatile components to provide a condensed component stream that includes water and non-aqueous product components, means coupled to said condenser means for separating water from product components in said condensed component stream, and means coupled to said second outlet of said evaporator means and to said water-separating means for separately delivering said non-volatile components and said product components at the job site.

2. The system set forth in claim 1 wherein said means for heating said waste stream in said evaporator means comprises a steam generator separate from said evaporator means for generating steam at a controllable temperature, means for circulating steam from said generator in a closed loop through said evaporator means, and means for controlling the temperature of steam in said closed loop.

3. The system set forth in claim 2 wherein said condenser means comprises a heat exchanger connected to said first outlet of said evaporator means, and means separate from said heat exchanger for circulating coolant in a closed loop through said heat exchanger in heat-exchange relationship with said volatile components.

4. The system set forth in claim 3 wherein said wheeled support base comprises a closed partitioned enclosure having said evaporator means, said heat exchanger, said water separating means and said delivery means disposed in a first partitioned chamber, and said steam generator and said coolant circulating means disposed in a second partitioned chamber separate from said first chamber.

5. A mobile system for on-site recovery of reusable components from a liquid waste stream comprising:

a wheeled support base including means for transport of said base between job sites, evaporator means carried by said base and including inlet means for selectively receiving a waste stream at a job site and directing such waste stream in a continuous flow into said evaporator means, means for heating the waste stream during flow through said evaporator means to a temperature coordinated with residence time of the waste stream in said evaporator means for evaporation of volatile from non-volatile components of the waste stream, and first and second outlet means on said evaporator means for receiving said volatile and non-volatile components respectively, said means for heating said waste stream in said evaporator means comprising a steam generator separate from said evaporator means for generating steam at a controllable temperature, means for circulating steam from said generator in a closed loop through said evaporator means, and means for controlling the temperature of steam in said closed loop, condenser means coupled to said first outlet for receiving and condensing said volatile components to provide a condensed component stream that includes water and non-aqueous product components, said condenser means comprising a heat exchanger operatively connected to said first outlet of said evaporator means, and means separate from said heat exchanger for circulating coolant through said heat exchanger in heat-exchange relationship with said volatile components, means coupled to said condenser means for separating water from product components in said condensed component stream, and means coupled to said second outlet of said evaporator means and to said water-separating means for separately delivering said non-volatile components and said product components at the job site, said wheeled support base comprising a closed partitioned enclosure having said evaporator means, said heat exchanger, said water separating means and said delivery means disposed in a first partitioned chamber, and said steam generator and said coolant circulating means disposed in a second partitioned chamber separate from said first chamber.

6. The system set forth in claim 5 wherein said system has a total waste stream capacity, and wherein said system further comprises a spill containment lining in said first chamber, said spill containment lining having a capacity at least equal to said total waste stream capacity of said system.

7. The system set forth in claim 5 wherein said evaporator means comprises a horizontal thin-film evaporator.

8. The system set forth in claim 5 wherein said inlet means includes an inlet tank in said first chamber and means in said first chamber for pumping the waste stream at constant flow rate from said inlet tank to said evaporator means.

9. The system set forth in claim 8 wherein said pumping means includes a flow sensor for measuring flow rate to said evaporator means, a flow control valve, and means for modulating said flow control valve as a function of said flow rate to maintain said constant flow rate.

10. The system set forth in claim 9 further comprising means coupled to said second outlet of said evaporator means for returning non-volatile components from said second outlet to said inlet tank.

11. The system set forth in claim 10 wherein said component-returning means comprises a storage tank coupled to said second outlet, a pump having an inlet coupled to said storage tank and an outlet, means for selectively connecting said pump outlet to said inlet tank and to waste storage, and means for sensing when said storage tank is empty and terminating operation of said pump.

12. The system set forth in claim 9 wherein said pumping means further comprises means for sensing when said intake tank is empty and terminating operation of said pumping means.

13. The system set forth in claim 12 further comprising second pumping means in said first chamber for pumping waste into said inlet tank, including means for sensing when said inlet tank is full and terminating operation of said second pumping means.

14. The system set forth in claim 5 wherein said water-separating means comprises an immiscible liquid separator tank in said first chamber that includes means for separating said condensed component stream into lighter and heavier components, and means for selectively directing said components to said delivering means.

15. The system set forth in claim 14 wherein said separator tank comprises an enclosure having a top and a bottom, a pair of spaced parallel partitions dividing said enclosure into first and second sections, a fluid inlet to said first section coupled to said condenser means, said first partition being disposed adjacent to said inlet and being spaced from said bottom and said second partition being spaced from said top, a first outlet positioned at a lower portion of said second section for drawing heavier liquids from said enclosure, and a second outlet at an upper portion of said first section for drawing lighter liquids from said enclosures.

16. The system set forth in claim 15 wherein said separator tank further comprises baffle means opposed to said inlet in said first section for reducing velocity of liquid entering said first section and thereby promoting phase separation of heavier and lighter liquid components.

17. The system set forth in claim 15 wherein said selectively-directing means comprises a pump having an inlet and an outlet connected to said delivering means, means for selectively connecting said pump inlet to one of said first and second outlets from said enclosure, and means for activating said pump responsive to a condition of material in said separation tank.

18. The system set forth in claim 14 further comprising a transfer tank connected between said condenser means and said separating means, a pump for feeding said condensed component stream from said transfer tank to said separating means, and means for activating said pump responsive to a condition of material in said transfer tank.

19. The system set forth in claim 14 wherein said separating means further comprises a molecular sieve coupled to said condenser means for removing miscible water from said condensed component stream.

20. The system set forth in claim 5 wherein said delivering means comprises a product holding tank coupled to said separating means, a pump connected to said product holding tank, and means for activating said pump responsive to a condition of material in said holding tank to pump fluid from said holding tank.

21. The system set forth in claim 4 wherein said wheeled base comprises a closed trailer.

22. The system set forth in claim 21 wherein fluid interconnections within said first chamber include flexible couplings for absorbing stress during operation and transport.

23. The system set forth in claim 22 further including means for draining all liquids from said system.

* * * * *